(12) United States Patent
Basak et al.

(10) Patent No.: US 9,621,516 B2
(45) Date of Patent: Apr. 11, 2017

(54) FIREWALL CONFIGURED WITH DYNAMIC MEMBERSHIP SETS REPRESENTING MACHINE ATTRIBUTES

(75) Inventors: Debashis Basak, San Jose, CA (US); Rohit Toshniwal, San Jose, CA (US); Allwyn Sequeira, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 1510 days.

(21) Appl. No.: 12/490,773

(22) Filed: Jun. 24, 2009

(65) Prior Publication Data
US 2010/0333165 A1   Dec. 30, 2010

(51) Int. Cl.
*G06F 15/16* (2006.01)
*G06F 9/00* (2006.01)
*H04L 29/06* (2006.01)

(52) U.S. Cl.
CPC .................. *H04L 63/0263* (2013.01)

(58) Field of Classification Search
CPC ............................ G06F 17/00; H04L 63/0263
USPC ......... 726/1–3, 11–15, 26–33; 713/153–154, 713/187–188, 193–194; 709/206, 249, 709/246–247, 389
See application file for complete search history.

(56) References Cited

U.S. PATENT DOCUMENTS

| | | | |
|---|---|---|---|
| 7,143,438 B1 | 11/2006 | Coss et al. | |
| 7,146,639 B2* | 12/2006 | Bartal et al. | 726/11 |
| 7,222,359 B2 | 5/2007 | Freund et al. | |
| 7,328,451 B2 | 2/2008 | Aaron | |
| 7,392,379 B2 | 6/2008 | Le Pennec et al. | |
| 7,392,539 B2 | 6/2008 | Brooks et al. | |
| 7,509,493 B2 | 3/2009 | Koti et al. | |
| 2002/0078370 A1* | 6/2002 | Tahan | 713/200 |
| 2005/0149721 A1* | 7/2005 | Lu | 713/154 |
| 2006/0010491 A1* | 1/2006 | Prigent | H04L 12/40104 726/11 |
| 2007/0192635 A1* | 8/2007 | Hutchison | 713/193 |
| 2007/0204338 A1* | 8/2007 | Aiello et al. | 726/11 |
| 2008/0115190 A1* | 5/2008 | Aaron | H04L 63/102 726/1 |
| 2008/0216175 A1 | 9/2008 | Pike | |
| 2008/0320127 A1 | 12/2008 | Fries | |
| 2009/0249470 A1* | 10/2009 | Litvin | H04L 63/0263 726/13 |

OTHER PUBLICATIONS http://www.netfilter.org/projects/ipset/index.htm (p. 1) (indicating that ipset written almost entirely by Jozsef Kadlecsic, copyright 1999-2008).
http://ipset.netfilter.org/ (IP sets Home, p. 1) (indicting documents under this site released under GNU/GPL license terms).

(Continued)

*Primary Examiner* — Evans Desrosiers

(57) ABSTRACT

A method is provided to control the flow of packets within a system that includes one or more computer networks comprising: policy rules are provided that set forth attribute dependent conditions for communications among machines on the one or more networks; machine attributes and corresponding machine identifiers are obtained for respective machines on the networks; and policy rules are transformed to firewall rules that include machine identifiers of machines having attributes from among the obtained machine attributes that satisfy the attribute dependent policy rules.

18 Claims, 13 Drawing Sheets

(56) References Cited

OTHER PUBLICATIONS http://ipset.netfilter.org/features.html (IP set Features pp. 1-3).
http://ipset.netfilter.org/install.html (Download and Install, p. 1).
http://ipset.netfilter.org/ipset.man.html (Tips and Examples, p. 1).
http://ipset.netfilter.org/iptables.man.html (ipset(8), pp. 1-9) (updated Oct. 20, 2008).
http://ipset.netfilter.org/tips.html (iptables(8), pp. 1-37) (updated Oct. 20, 2008).
http://ipset.netfilter.org/changelog.html (ChangeLog, pp. 1-7).

* cited by examiner

| Hostname / IP ▲ | State | Network Activity | Coverage | Operating System |
|---|---|---|---|---|
| [ ] | All ▼ | All ▼ | All ▼ | All ▼ |
| proxy220.vmware.com 10.16.67.220 | ✓ | ⊘ | Apache 2.2.8 | Linux |
| license-3.eng.vmware.com 10.17.6.237 | ✓ | ○ | Microsoft Windows | Windows 2003 Enterprise Edition |
| 10.115.198.107 | ✓ | ● | Apache 2.2.2 | Linux |
| 10.115.198.108 | ✓ | ● | Apache 2.2.2 | Linux |
| 10.115.198.109 | ✓ | ○ | - | Linux |

| Server IP / | Host Name | Coverage | OS |
|---|---|---|---|
| 192.168.110.107 | | Microsoft Windows NNTP 5.0.2195.7035(Drop Session), Microsoft Windows(Drop Session) | Windows 2000 Server |
| 192.168.110.108 | | Microsoft Windows(Drop Session), SQL Server 2000 SPo(Drop Session) | Windows 2003 Enterprise Edition |
| 192.168.110.111 | | Apache 2.0.40(Drop Session) | Linux |
| 192.168.110.122 | | Exchange Server 2000 SP3(Drop Session), Microsoft Windows NNTP 5.0.2195.6702(Drop Session), Microsoft Windows(Drop Session), SQL Server 200 SP0(Drop Session) | Windows 2000 Advanced Server |
| 192.168.110.165 | | wu-ftpd 2.6.0(Drop Session) | Linux |
| 192.168.110.199 | | Apache 2.2.0(Drop Session), Sendmail 8.13.1(Drop Session) | Linux |
| 192.168.110.20 | | Exchange Server 2000 SP0(Drop Session), Microsoft Windows(Drop Session) | Windows 2000 Advanced |

FIG. 3

| Policy Rule No. | Source Operating System | Destination Application | Action |
|---|---|---|---|
| 1 | Windows 2003 Enterprise Edition | Apache 2.2.0 or Apache 2.2.2 | Drop |
| 2 | Windows 2000 Enterprise Edition | SQL Server 2000 | Allow |

*FIG. 4*

| Base on Policy Rule Number | Source Machine Endpoint Identifier | Source Port | Destination Machine Endpoint Identifier | Destination Port | Action |
|---|---|---|---|---|---|
| 1 | 10.16.67.220 | Any | 10.17.6.237 | 80 | Block |
| 1 | 10.115.198.107 | Any | 10.17.6.237 | 80 | Block |
| 1 | 10.115.198.108 | Any | 10.17.6.237 | 80 | Block |
| 1 | 192.168.110.199 | Any | 10.17.6.237 | 80 | Block |
| 1 | 10.16.67.220 | Any | 192.168.110.108 | 80 | Block |
| 1 | 10.115.198.107 | Any | 192.168.110.108 | 80 | Block |
| 1 | 10.115.198.108 | Any | 192.168.110.108 | 80 | Block |
| 1 | 192.168.110.199 | Any | 192.168.110.108 | 80 | Block |
| 2 | 192.168.110.108 | Any | 10.17.6.237 | 1464 | Allow |

FIG. 5

| | | | | Logged in as: admin | | Logout | Release: 1.0-G64 ⓘ |
|---|---|---|---|---|---|---|---|

Corporate DC

| Summary | VM Flow | VM Wall |
|---|---|---|

| Add | Up | Down | Delete | Delete All | Commit | L4 Rules | L2/L3 Rules | Revert to Snapshot | -- |
|---|---|---|---|---|---|---|---|---|---|

| Source (A.B.C.D/nn) | Source Port | Destination (A.B.C.D/nn) | Destination Application | Destination Port | Protocol | Action |
|---|---|---|---|---|---|---|
| *Data Center High Precedence Rules* | | | | | | |
| Outside Corporate DC | ANY | DMZ/() (Corporate DC) | HTTP | 80 | TCP | ALLOW |
| *Rules below this level have lower precedence than the cluster level rules* | | | | | | |
| Outside Corporate DC | ANY | Internal Servers (Corporate DC) | NBSS | 139 | TCP | ALLOW |
| *Default Rules* | | | | | | |
| ANY | DHCP-Client | ANY | DHCP-Server | 67 | UDP | ALLOW |
| ANY | DHCP-Server | ANY | DHCP-Server | 68 | UDP | ALLOW |
| ANY | ANY | ANY | - | ANY | TCP | ALLOW |
| ANY | ANY | ANY | - | ANY | UDP | ALLOW |

| Machine Name | IP Address |
|---|---|
| Active Directory 1 | IP100 |
| Active Directory 2 | IP101 |
| Bugzilla | IP102 |
| BUILD_SVR | IP103 |
| CRM | IP104 |
| cvs-svr | IP105 |
| eng-wiki | IP106 |
| Exchange | IP107 |
| HomeDirectories | IP108 |
| Index Server | IP109 |
| LEADS_DB | IP110 |
| Marketing Store | IP111 |
| Mass_Mailers | IP112 |
| Mktg_Blog_svr | IP113 |
| Oraclw_ERP | IP114 |
| Outbound_PR | IP115 |
| PeachTree | IP116 |
| SalesForce | IP117 |
| SharePoint | IP118 |
| Siebel | IP119 |

*FIG. 6C*

Corporate DC

Logged in as: admin    Logout    Release: 1.0-G64

| Summary | VM Flow | VM Wall |
|---|---|---|

| Add | Up | Down | Delete | Delete All | Commit | L4 Rules | L2/L3 Rules | Revert to Snapshot |
|---|---|---|---|---|---|---|---|---|

| Source (A.B.C.D/nn) | Source Port | Destination (A.B.C.D/nn) | Destination Application | Destination Port | Protocol | Action |
|---|---|---|---|---|---|---|
| Data Center High Precedence Rules | | | | | | |
| Outside Corporate DC | ANY | DMZ////(Corporate DC) | HTTP | 80 | TCP | ALLOW |
| Vlan 2(Corporate DC) | ANY | Vlan 60(Corporate DC) | - | ANY | TCP | DENY |
| Engineering(Corporate DC) | ANY | Finance(Corporate DC) | ORACLE-TNS | 1521 | TCP | DENY |
| Rules below this level have lower precedence than the cluster level rules | | | | | | |
| Default Rules | | | | | | |
| Outside Corporate DC | ANY | Internal Servers(Corporate DC) | NBSS | 139 | TCP | ALLOW |
| ANY | DHCP-Client | ANY | DHCP-Server | 67 | UDP | ALLOW |
| ANY | DHCP-Server | ANY | DHCP-Server | 68 | UDP | ALLOW |
| ANY | ANY | ANY | - | ANY | TCP | ALLOW |
| ANY | ANY | ANY | - | ANY | UDP | ALLOW |

| VM Name | IP Address |
|---|---|
| BUILD_SVR | IP800 |
| cvs_svr | IP801 |
| Bugzilla | IP802 |
| eng-wiki | IP803 |
| PeachTree | IP804 |
| Siebel | IP805 |

*FIG. 8*

| Source Machine Endpoint | Source Port | Destination Machine Endpoint | Destination Port | Protocol | Action |
|---|---|---|---|---|---|
| IP800 | ANY | IP804 | 1521 | TCP | DENY |
| IP800 | ANY | IP805 | 1521 | TCP | DENY |
| IP801 | ANY | IP804 | 1521 | TCP | DENY |
| IP802 | ANY | IP805 | 1521 | TCP | DENY |
| IP802 | ANY | IP804 | 1521 | TCP | DENY |
| IP802 | ANY | IP805 | 1521 | TCP | DENY |
| IP803 | ANY | IP804 | 1521 | TCP | DENY |
| IP803 | ANY | IP805 | 1521 | TCP | DENY |

*FIG. 9*

FIREWALL CONFIGURED WITH DYNAMIC MEMBERSHIP SETS REPRESENTING MACHINE ATTRIBUTES

BACKGROUND

A firewall typically comprises a combination of hardware and software used to implement a communication policy between machines operating in a network environment. A network firewall commonly serves as a primary line of defense against external threats to an organization's computer systems, networks and critical information. A firewall may serve as a network gateway that applies a security policy to filter traffic between a network under private administrative control, such as a corporate intranet, and a public network such as the Intranet. A firewall also can be used to partition networks and to partition or to interconnect VPNs. A firewall may be used within a network to impose communications policies between sub-networks or machines within a network. A firewall may define different policies to govern communications between different networks, subnetworks or machines.

Information ordinarily is transmitted within networks in packets, and the term packet refers to a unit of data communicated within a network. A packet typically includes a packet source identifier and a packet destination identifier used to navigate the packet data through a network. The term packet may refer to a unit of data communicated at any level of the OSI protocol stack and between levels of the OSI stack.

A firewall inspects and filters packets at an interface between networks and passes or blocks packets based upon user-defined criteria. The filtering involves a decision making process that includes checking contents of packets entering or leaving an associated network and passing or denying passage of packets through the firewall depending upon whether the packets comply with predefined access rules.

A security administrator ordinarily configures firewall rules within a file. The firewall rules instruct a firewall engine as to which packets to pass and which to block. A typical firewall rule identifies a packet source, a packet destination, service group (e.g., port number and protocol) and an appropriate action such as to pass or drop a packet or report the packet. A firewall may have several network interfaces. The firewall intercepts and inspects packets that enter any of its network interfaces to identify matches between the packet contents and the security rules the firewall has been configured to enforce.

The following is an example firewall rule.

Source=ANY, Destination=192.148.120.12, Port=80, Protocol=TCP, Action=Accept, where 192.148.120.12 is an IP address that identifies a specific web server to which port 80 (HTTP) traffic is to be allowed; and ANY signifies all devices on the network (i.e., all addresses on the network).

The above firewall rule identifies a specific destination machine IP address as a condition for application of the rule, and indicates that any source machine address suffices to meet another condition for the application of the above rule. Thus, the above firewall rule is an example of a firewall rule that includes a pair of machine identifier dependent conditions.

One challenge with defining rules in terms of source and destination addresses is the need for an administrator to continually update firewall rules to keep abreast of changes in network configuration. Machines may be added or removed from a network, and machines' IP addresses can change from time to time, requiring corresponding changes to firewall rules. An added administrator burden can arise when defining or updating firewall rules that span non-contiguous IP addresses since a separate firewall rule may have to be configured for each such span. An administrator may choose to meet this additional burden by defining an over inclusive contiguous range of IP addresses that encompasses one or more extraneous IP addresses rather than define a separate firewall rule for each contiguous set of IP addresses. The former approach sacrifices security for convenience. The latter approach leads to management of a larger set of rules.

In complex networks in which changes are many and frequent, the need to update firewall rules to keep pace with changes to the configuration network can pose a significant administrative burden. For example, if a firewall rule specifies a set of WEB server destination addresses to which port 80 is to be allowed, and later, a new WEB server to which port 80 is to be allowed is added to the network, then a firewall administrator may be required to update the set of destination addresses in that rule.

Referring again to the rule set forth above, for instance, assume that an addition of a new web server at 192.148.120.13 to the network to which the firewall rule applies, requires the Destination field in the above rule to be modified to encompass the contiguous range, Destination=192.148.120.12-192.148.120.13. However, if the new IP address of the web server was 192.148.120.15, for example, and therefore, the two IP addresses did not fall within a contiguous range or an IP subnet, then the administrator could choose to sacrifice security for convenience by specifying an over inclusive range or subnet that includes the desired servers, but that also leaves holes, such that if a non-web server (e.g. a database server) was brought up at an address corresponding to one of these holes, it would have port 80 traffic allowed to it. Alternatively, the administrator could specify multiple separate firewall rules, one each for 192.148.120.12 and 192.148.120.17.

SUMMARY

A method and system and article of manufacture are provided for use to control the flow of packets between networks. In some embodiments, policy rules set forth attribute dependent conditions for communications among machines on different networks. Updates of machine attributes and corresponding machine identifiers for machines on the network are obtained through either a push or a pull process via tools that monitor the networks. Updates and corresponding machine identifiers also can be obtained for sets of machines that are managed manually by a network administrator, for example. The policy rules are transformed to firewall rules that include machine identifiers of machines having attributes from among the machine attributes that satisfy the attribute dependent policy rules through either a push or a pull process. The firewall rules are stored for use by a firewall engine. Therefore, policy rules can be specified in terms of attributes of machines on the network, and firewall rules can be regularly updated automatically based upon changes in attributes of machines on the network.

In some embodiments, transforming policy rules to firewall rules includes resolving one or more set operations within an attribute condition to produce a resolved attribute condition. Transforming further includes generating at least one firewall rule for each machine identifier of a machine having all attributes required to satisfy the resolved attribute condition within the policy rule. Thus, policy rules can be specified in terms of complex functions that involve set operations, for example.

In some embodiments, for example, software based tools monitor multiple machine attributes such as what software runs on different machines, the physical location of machines and the network properties of machines. Such tools also may monitor the arrival of new machines to a network and the departure of machines from the network. Network communication policies, therefore, can be articulated based upon a variety of different machine attributes.

BRIEF DESCRIPTION OF THE DRAWINGS

FIG. 3 is an illustrative drawing showing a screen display produced based upon information gathered by a software discovery tool showing first attribute information and corresponding endpoint identifiers for machines operative in the system of FIG. 1.

FIG. 4 shows an illustrative set of policy rules with attribute dependent conditions dependent upon application software running on source machines and operating system software running on destination machines.

FIG. 5 shows an illustrative set of firewall rules produced based upon the policy rules of FIG. 4 and the first attribute information and corresponding endpoint identifiers of FIG. 3.

FIGS. 6A-6C are illustrative drawings showing screen displays produced based upon information gathered by a infrastructure management tool showing a machine location hierarchy specifying second attribute information (i.e. physical location) and example policy rules (FIGS. 6A-6B) and mappings between machines and endpoint identifiers (FIG. 6C).

FIG. 7 is an illustrative drawing showing a screen display produced based upon information gathered by a network management tool showing a machine network hierarchy specifying third attribute information (i.e. network connections) and corresponding policy rules.

FIG. 8 is an illustrative drawing showing a mapping between the virtual machines shown in FIG. 7 and their endpoint identifiers.

FIG. 9 shows an illustrative set of firewall rules based upon the policy rule of FIG. 7 and the mapping of FIG. 8.

DETAILED DESCRIPTION

The following description is presented to enable any person skilled in the art to make and use a firewall in accordance with embodiments of the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention might be practiced without the use of these specific details. In other instances, well-known structures and processes are shown in block diagram form in order not to obscure the description of the embodiments with unnecessary detail. Thus, the present invention is not intended to be limited to the embodiments shown, but is to be accorded the widest scope consistent with the principles and features disclosed herein.

Figure 1:
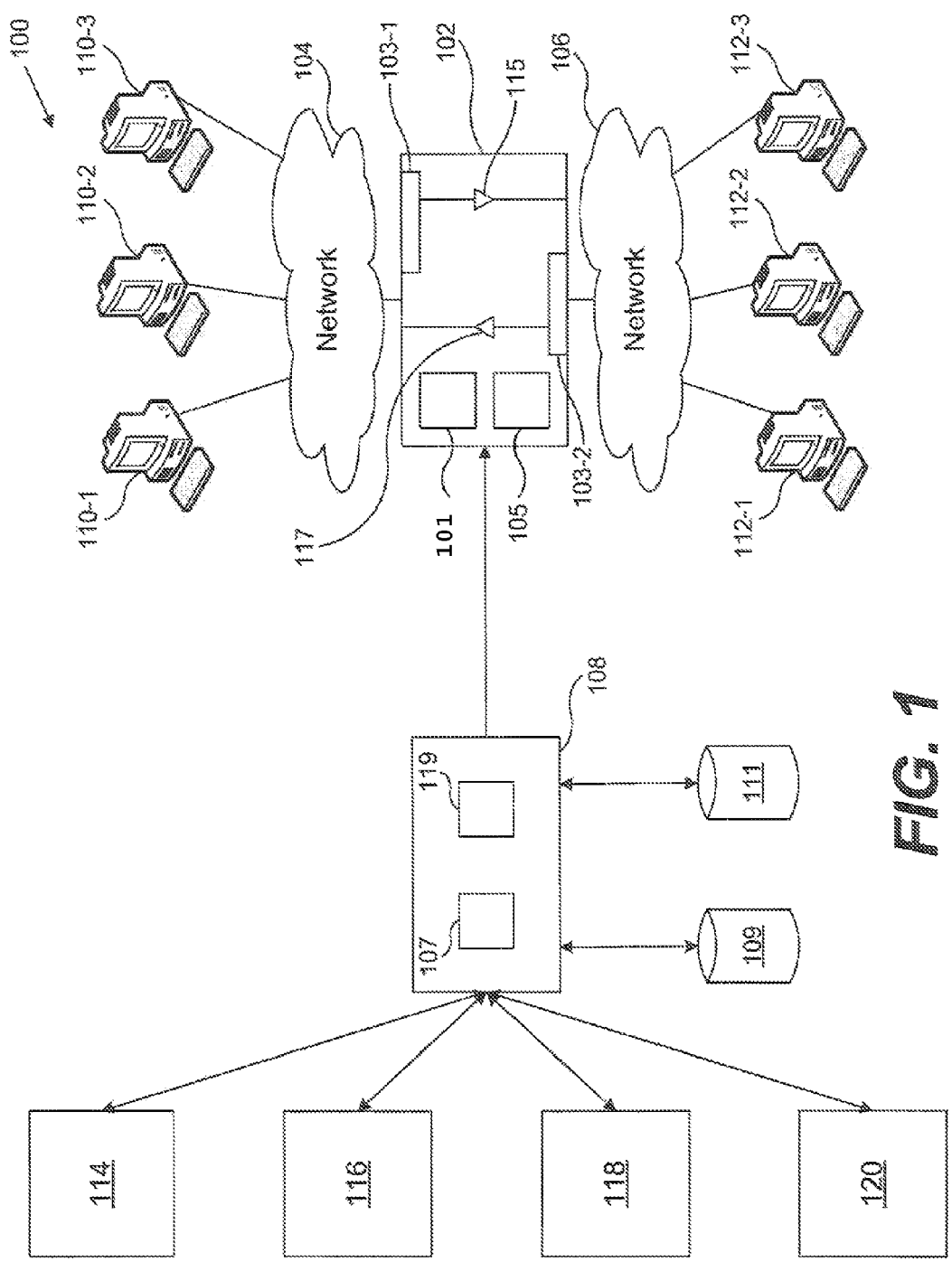
FIG. 1 is an illustrative block diagram of a communication system that includes multiple networks of machines and that includes a firewall to impose policies upon communications between machines.

FIG. 1 is an illustrative block diagram of a communication system that includes multiple networks of machines and that includes a firewall to impose policies upon communications between machines. As used herein, the term "machine" includes physical machines and virtual machines (VMs) implemented in software on a hardware host machine. The system 100 includes a firewall engine 102 that is coupled to intercept and inspect packets transmitted between a first network 104 and a second network 106. The firewall engine 102 includes machine readable storage media 101 to store firewall rules and also includes machine readable storage media to 103-1, 103-2 to capture packets in transit between the networks so that they can be inspected and evaluated based upon the firewall rules. As used herein, machine readable storage media include hardware storage media such as RAM, FLASH memory or ROM, for example. A first packet storage media 103-1 captures packets in transit from the first network 104 to the second network 106. A second packet storage media 103-2 captures packets in transit from the second network 106 to the first network 104. The firewall engine includes a computer processor 105 to control the interception and inspection of packets and to determine an action to take with regard to packets captured within the storage media 101 based upon the firewall rules in storage media 101, such as to permit or to deny passage of a packet between the first and second networks and whether passage or denial of the packet is to be reported to an administrator.

More particularly, the firewall rules determine the action of the firewall engine 102 with respect to a given packet captured within the first or second packet storage media 103-1, 103-2 based upon information within the packet such as, source machine identifier, receiving machine identifier or both such identifiers, for example. The computer processor 105 within the firewall engine 102 determines whether source and/or destination machine identifiers within the packet match up with machine identifier dependent conditions specified within the firewall rules. The processor 105 within the firewall engine 102 controls passage or denial of passage of the packet based upon the outcome of that matching process.

Based upon the outcome of matching of a captured packet against firewall rules, the processor 105 configures the firewall 102 as a particular machine to effect an action specified in the firewall rules. For example, if the matching determines that passage of the captured packet is to be allowed, then a communication path is provided within the firewall 102 to permit passage of the packet between the networks. If on the other hand, the matching determines that passage of the captured packet is to be blocked or denied, then no such communication path is provided within the firewall 102 to permit passage of the packet between the networks. More specifically, drivers 115 and 117 act as switches within the firewall 102 used to effect passage or blocking of a captured packet. The processor 105 turns on driver 115 to create a communication path to allow passage of a packet captured in the first packet storage media 103-1 while in transit from the first network 104 to the second network 106, and turns off driver 115 to block passage of such packet from the first network 104 to the second network 106. Conversely, the processor 105 turns on driver 117 to create a communication path to allow passage of a packet captured in the second packet storage media 103-2 while in transit from the second network 106 to the first network 104, and turns off driver 117 to block passage of such packet from the second network 106 to the first network 104.

A firewall manager 108 is configured by an administrator who formulates policy rules that are stored in machine readable storage media 109. The firewall manager 108 obtains information concerning attributes of machines on the first and/or second networks 104, 106 and stores the obtained attribute information in storage media 111. The firewall manager 108 uses the attribute information to transform policy rules into firewall rules. The first network 104 includes a plurality of first machines 110, and the second network 106 includes a plurality of second machines 112. Each of these machines can be represented by a single endpoint identifier (e.g., IP address, MAC address or VM name). A machine may possess attributes such as the software that it executes, its physical location or its network properties (e.g., VLAN, IP address, wired, wireless) to name a few, for example. Attributes, therefore, represent characteristics of machines, and policy rules define firewall actions based upon such characteristics. Policy rules also can be defined that involve machine attributes indicative of task-driven logical groupings to address a tactical issue such as, a set of vNIC/IP tuples that are infected with a worm or virus, or a set of tuples not passing PCI compliance, for example.

Policy rules are defined based upon machine attributes, while firewall rules are defined based upon machine endpoint identifiers. A policy rule may condition the passage or denial of a message upon an attribute of a machine sending the message, or an attribute of a machine destined to receive the message or attributes of both, for example. The policy rules typically represent a higher level more abstract articulation of administrator intent as to network management, and the firewall rules represent machine-specific directives used by the firewall engine 102 to implement that intent.

The firewall manager 108 includes one or more computer processors 107 used to identify matches between attributes of machines coupled to run on the first and/or second networks 104, 106 and attributes specified for attribute dependent conditions set forth in the policy rules. The firewall manager 108 transforms a policy rule to one or more machine identifier dependent firewall rules by matching attributes of machines running on the networks 104, 106 with attributes specified within conditions set forth in one or more policy rules. The firewall manager 108 transforms policy rules to firewall rules. A single policy rule may be transformed to multiple corresponding machine-specific firewall rules.

For example, an attribute-based policy rule may require that all machines running on the first network 104 that have the attribute of running a specific application software program are to be blocked from sending packets to any machine on the second network 106. In that case, the firewall manager 108 would create endpoint identifier-based firewall rules that specify the endpoint identifiers for all machines on the first network 104 that run the specified application and that designate that the action is to block passage of every packet that includes any of those specified endpoints as a source address and that includes the endpoint of any machine on the second network 106 as a destination address. The firewall manager 108 thereby transforms a machine attribute-based policy rule created by an administrator to one or more endpoint identifier-based firewall rules that can be enforced by the firewall engine 102.

As explained above, different machines 110, 112 running on different networks 104, 106, respectively, may possess different attributes. However, especially in large and complex networks, the attributes of machines on the different networks may change frequently. The software on a machine, the machine's physical location and the machine's network properties may change. Moreover, machines may join or depart from the network. These changes can influence the applicability of different policy rules to different machines, which in turn, can directly affect the firewall rules applicable to different packet transmissions. Thus, firewall rules that are created based upon policy rules must be updated to keep abreast of changes in machine attributes upon which the policy rules and the firewall rules depend. A computer program based software discovery tool 114 tracks changes in software running on the machines. A computer program based infrastructure management tool 116 keeps track of the physical location of the machines. A computer program based network management tool 118 keeps track of the network properties of the machines. The firewall manager 108 uses updated attribute information provided by the software discovery tool 114, infrastructure management tool 116 and network management tool 118 to keep machine identifier-based firewall rules up to date and current by transforming attribute-based policy rules to updated firewall rules based upon the machine attribute updates.

Block 120 represents one or more sets of machines that are manually defined on a tactical or ad hoc basis by a network administrator. An administrator can manually assign attributes to machines to address unanticipated or tactical concerns such as the need to quarantine machines that are infected with a worm or virus or the need to limit communications with machines that failed to pass a PCI compliance test. For example, an administrator can assign infected machines to a set defined as including only machines infected by a worm or virus. The administrator then can define a policy rule that includes an attribute-dependent condition based upon an attribute, e.g., "infected," possessed by machines in the set of infected machines. Furthermore, the administrator can assign machines that are non-compliant with PCI to a set defined as including only machines that are non-compliant with PCI. The administrator then can define a policy rule that includes an attribute-dependent condition based upon an attribute, e.g., 'non-compliant with PCI' possessed by machines in the set of PCI non-compliant machines.

More specifically, the software discovery tool 114 obtains first attribute information indicative of the types of software running on different machines. The software discovery tool 114 may be implemented as a plurality of software modules or network agents deployed on the first or second networks 104, 106 or as a plurality of software modules or machine agents deployed on machines 110, 112 on those networks to execute discovery processes on different machines to learn the types of software running on machines 110, 112 on those networks. In some embodiments, the software discovery tool 114 receives information to identify the OS and applications running on machines 110, 112 through manual updates. The software discovery tool 114 creates in a machine readable storage medium an inventory that comprises first attribute information that correlates software determined to be running on respective machines with respective endpoint identifiers such as IP address, IP/MAC, machine name.

The infrastructure management tool 116 obtains second attribute information indicative of physical location of different machines 110, 112. The infrastructure management tool 116 may be implemented as a one or more software modules or agents deployed on the first or second networks 104, 106 to execute a process to keep track of physical location such as server room, rack, data center, cluster, and hardware host machine for example. In some embodiments, the infrastructure management tool 116 controls the movement of machines from one location to another, example migration of a VM from one hardware host to another, thus tracking the new location of a machine. In some embodiments, the infrastructure management tool 116 can receive information indicative of physical location on machines 110, 112 through manual updates. The infrastructure management tool 116 creates in a machine readable storage medium a record of second attribute information that correlates physical location information with respective machine endpoint identifiers.

The network management tool 118 is coupled to provide third attribute information indicative of the network memberships of different machines. The network management tool 118 may be implemented as a one or more software modules or agents deployed on the first or second networks 104, 106 to execute a process to track network information such as IP addresses, MAC address, machine name, and VLAN, for example. In some embodiments, the network management tool 118 periodically receives information from network routers and switches, DHCP servers, DNS servers indicative of network memberships of different machines. The network management tool 118 creates in a machine readable storage medium a record of third attribute information that correlates network information with respective machine endpoint identifiers.

It will be appreciated that although FIG. 1 depicts only one firewall engine 102 and two networks 104, 106, embodiments such as the embodiment of FIG. 10 discussed below, may include multiple firewall engines and many networks. Thus, a firewall manager may automatically gather updated attribute information, automatically transform policy rules to updated firewall rules and automatically distribute those rules among multiple firewalls that regulate traffic between many different pairs of networks.

Figure 2A:
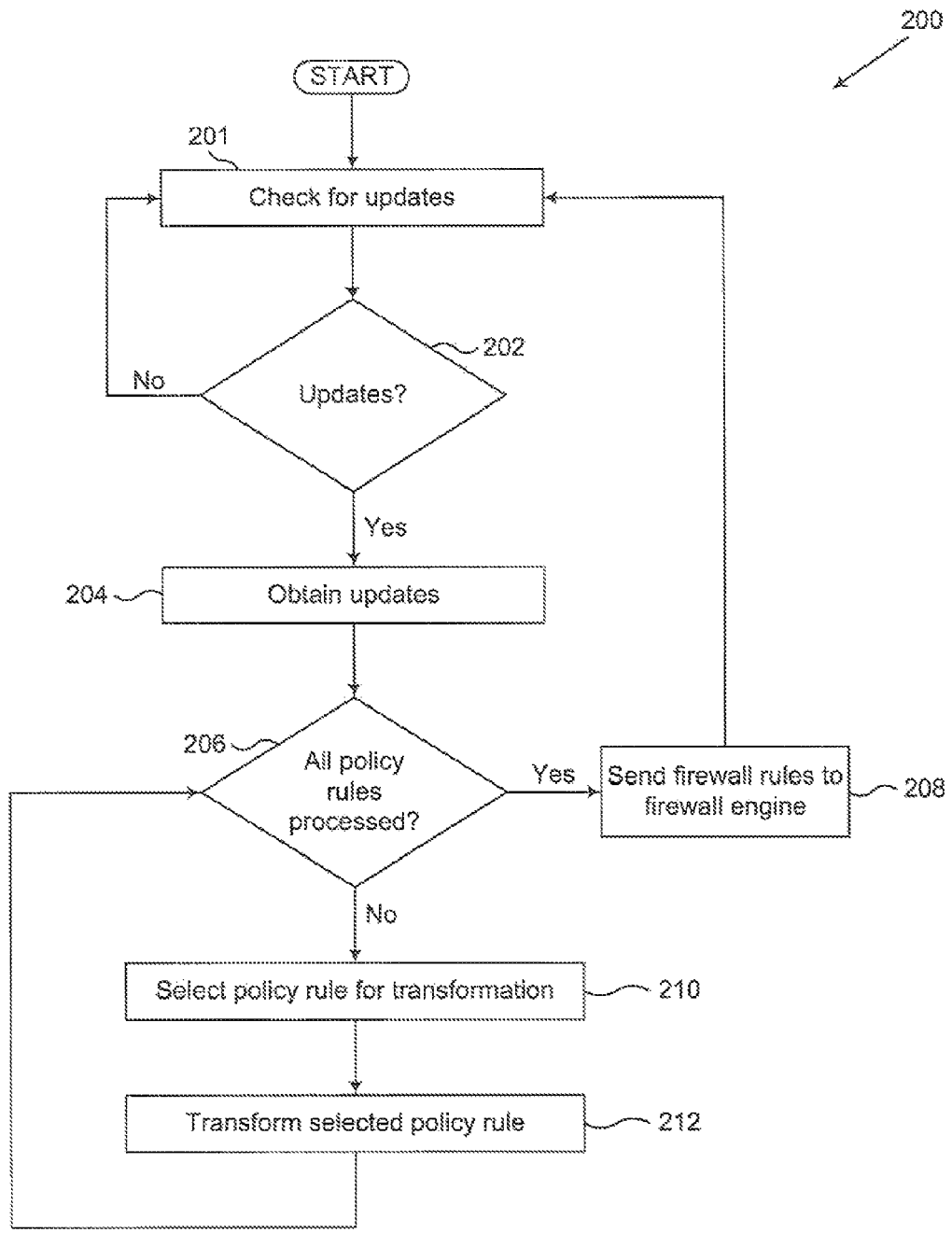
FIG. 2A is an illustrative flow diagram of a process to obtain updated attribute and machine endpoint identifier information and to transform machine attribute dependent policy level rules to machine endpoint identifier dependent firewall rules based upon the update information.

FIG. 2A is an illustrative flow diagram of a process 200 performed by firewall manager 108 to obtain updated attribute and machine endpoint identifier information and to transform machine attribute dependent policy level rules to machine endpoint identifier dependent firewall rules based upon the update information. The processor 107 of firewall manager 108 is configured according to machine readable program code stored in machine readable storage media 119 to perform the process 200. The flow diagram of FIG. 2A includes a plurality of modules, each representing an aspect of the process that configures the processor 107 of firewall manager 108 to perform a specified function of such module.

Module 201 configures the firewall manager 108 to determine whether there have been updates to machines on the system or manual changes to membership of a set of machines. In some embodiments, module 201 implements a "pull" process in which module 201 causes the firewall manager 108 to periodically initiate polling of the software discovery tool 114, infrastructure management tool 116, and network management tool 118 to determine whether there have been updates to attributes of machines tracked by these tools or a change in the identity of one or more machines tracked by these tools, i.e. whether machines have joined or departed. Moreover, module 201 determines whether the network administrator has changed the membership of a set of machines represented by block 120 that may have been created for tactical reasons such as to quarantine a worm or virus, for example. In response to a polling request initiated by module 201, the machine attribute update gathering tools 114, 116 and 118 send indications to the firewall manager 108 of whether or not there have been changes to the machines or machine attributes that they monitor. Alternatively, for example, module 201 can be implemented to support a "push" process in which each of the tools 114, 116 and 118 initiate notification of the firewall manager 108 of changes to the machines or machine attributes. It will be appreciated, however, that whether module 201 implements a pull or a push process, the firewall engine 108 regularly obtains updates, so that it can keep firewall rules up to date by applying updated attribute and machine identifier information to transform policy rules to updated firewall rules.

Decision module 202 determines whether module 201 has obtained updated attribute and machine identifier information. When decision module 202 determines that there are updates, download module 204 causes the firewall manager 108 to obtain attribute update information and corresponding machine endpoint update information from update gathering tools 114, 116 and 118. The update information may include only a portion of the attribute and corresponding machine identifier information gathered by tools 114, 116 and 118 that changed or is new since the prior update cycle of the process 200 or it may include a complete report of current attribute and machine identifiers collected by the machine attribute update gathering tools. The update information obtained from tools 114, 116 and 118 is stored in machine readable storage media 119.

An administrator may specify numerous policy level rules to be transformed to firewall rules by the firewall manager 108. Decision module 206 keeps track of which policy rules already have undergone transformation processing during a current update processing iteration and which rules still remain to be processed. If decision module 206 determines that no more policy level rules remain to be transformed during the current transformation update cycle, then transmission module 208 causes the firewall manager 108 to transmit the firewall rules created during the current update cycle to the firewall engine 102. Process flow then proceeds back to module 201.

If on the other hand, decision module 206 determines that are one or more policy level rules that remain to be transformed during the current transformation update cycle, then rule selection module 210 selects a remaining policy rule for transformation processing. As explained below, policy rules and corresponding firewall rules may be prioritized, and the order of prioritization may determine the order in which such policy rules are transformed to corresponding firewall rules.

Transformation module 212 causes the firewall manager 108 to transform the selected policy rule to corresponding firewall rules. Transformation involves matching attributes in the selected policy rule with attribute information in the updates received via module 204. Attribute update information provided by the tools 114, 116 and 118 associate machine attributes with machine endpoint identifiers so as to indicate which machines possess which attributes. Transformation further involves transforming the selected policy rule that identifies one or more attributes to one or more firewall rules that identify one or more corresponding specific machines that possess the attributes identified in the policy rule according to the most recent update information received by module 204.

The update information obtained from the attribute gathering tools 114, 116, 118 via module 204 may indicate that numerous machines possess a given attribute. Consequently, a transformation of a given policy level rule may result in creation of a plurality of corresponding firewall rules. Moreover, the policy rules may include combinations of set operations, such as set-OR (i.e., intersection), set-AND (i.e., union) and set-Complement (i.e., Not). Therefore, transformation of a given policy rule may involve resolution of set operations to produce corresponding firewall rules. Following module 212, process flow returns to module 206, which again determines whether additional policy rules remain to be transformed during the current update cycle.

Figure 2B:
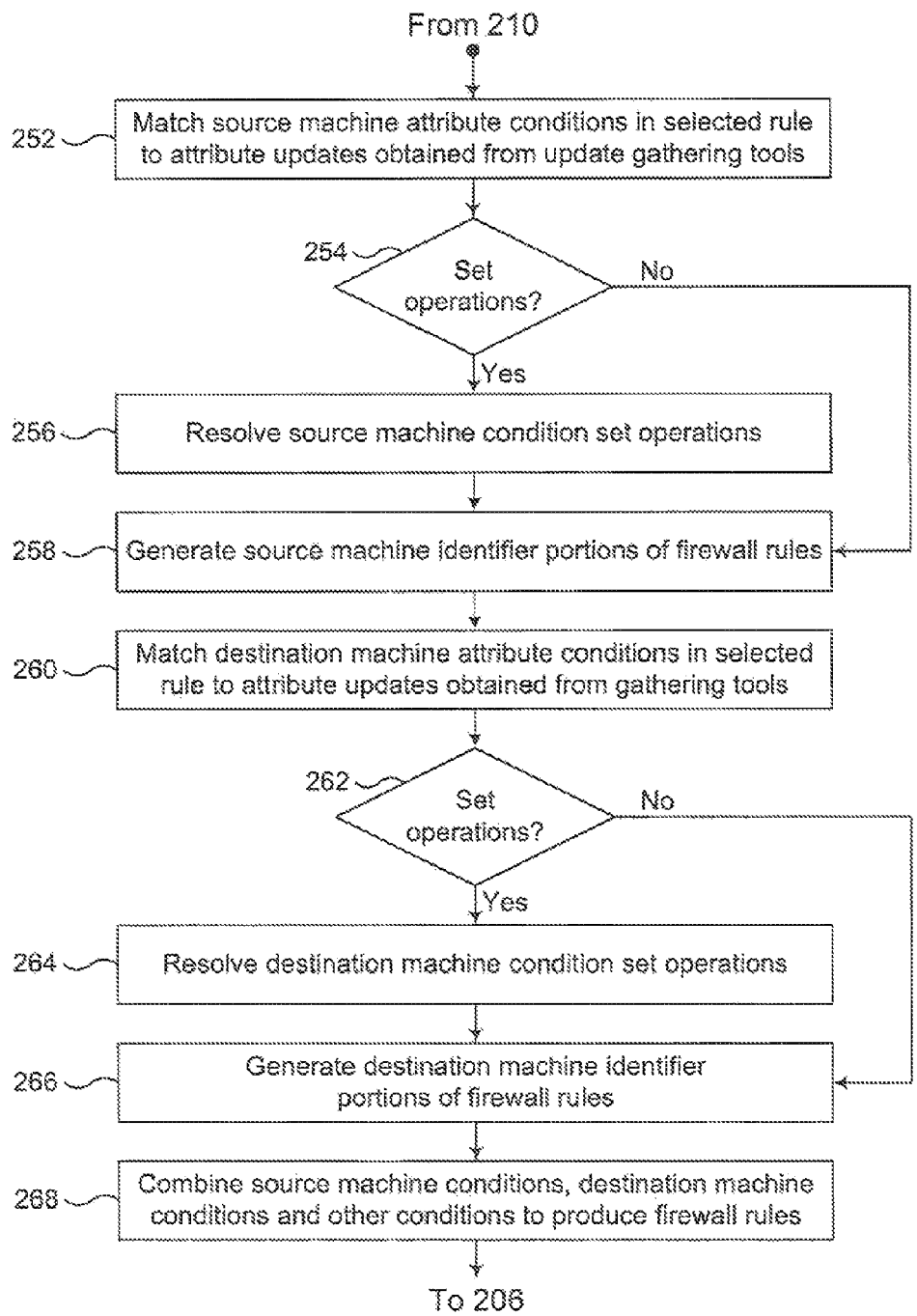
FIG. 2B is an illustrative flow diagram showing additional details of transformation of an attribute dependent policy rule to one or more machine identifier dependent firewall rules.

FIG. 2B is an illustrative flow diagram showing additional details of transformation module 212 of FIG. 2A used to transform an attribute dependent policy rule to one or more machine identifier dependent firewall rules. Source machine attribute matching module 252 matches each attribute in the source machine dependent condition of the selected policy rule to an attribute update obtained from update gathering tools 114, 116 or 118. An attribute dependent condition in a policy rule may be a function of more than one attribute. In particular, for example, an attribute dependent condition may be a function of one or more set operations involving multiple attributes.

Decision module 254 determines whether the source machine attribute condition within the selected rule contains set operations. If so, then set resolution module 256 causes the firewall manager 108 to resolve set operations within the source machine attribute dependent condition. Set resolution determines whether one or more attributes specified within the condition are connected by an AND set operator signifying that the same machine must satisfy every attribute connected by the AND set operator to meet the condition. For each group of attributes connected by an AND set operator, the module 256 resolves the group to a set of machines that possesses every attribute in the group. Set resolution also determines whether one or more attributes within the condition are connected by an OR set operator signifying that only one attribute connected by the OR set operator must be satisfied to meet the condition. For each group of attributes connected by an OR set operator, the module 256 resolves the group to a set of machines that possesses at least one attribute in the group. Thus, for a group of attributes connected by an AND set operator, a machine endpoint satisfies the AND set operation if it is associated with every attribute that is subject to the AND set operation. However, for a group of attributes connected by an OR set operator, a machine endpoint satisfies the OR set operation if it is associated with at least attribute that is subject to the OR set operation. Moreover, set operations may be complex involving both AND set operations and Or set operations. Note that the set-Complement operation is resolved in the firewall engine 102.

Following set operation resolution by module 256 or a decision by module 254 that there are no set operations to resolve, firewall rule source identifier generation module 258 causes the firewall manger 108 to generate a separate source machine identifier portion of a firewall for each machine that satisfies the source attribute condition of the selected rule.

Next, source machine attribute matching module 260 matches each attribute in the destination machine dependent condition of the selected policy rule to an attribute reported by gathering tools 114, 116, or 118. Decision module 262 determines whether the destination machine attribute condition within the selected rule contains set operations. If so, then set resolution module 264 causes the firewall manager 108 to resolve set operations within the destination machine attribute dependent condition. Following set operation resolution by module 264 or a decision by module 262 that there are no set operations to resolve, firewall rule source identifier generation module 266 causes the firewall manger 108 to generate a separate destination machine identifier portion of a firewall for each machine that satisfies the source attribute condition of the selected rule.

Firewall rule combination module 268 causes the firewall manager 108 to produce a separate firewall rule portion for each possible combination of a firewall source machine identifier portion generated by module 258 with a firewall destination machine identifier portion generated by module 266. Moreover, module 268 in each firewall rule other non-machine dependent conditions presented within the selected policy rule. Such other policy rule conditions may include packet-content dependent conditions such as source port, destination port and protocol, for example.

Table 1 sets forth two example policy rules that can be transformed according to the process of FIGS. 2A-2B.

TABLE 1

| POLICY RULE | Source Machine Attribute Condition | Destination Machine Attribute Condition | Destination Port | Protocol | Action |
|---|---|---|---|---|---|
| 1 | ANY | (HTTP INTERSECTION Bldg1) | 80 | 80 | Accept |
| 2 | VLAN20 UNION VLAN30 | (HTTP INTERSECTION Bldg1) | 80 | 80 | Block |

Referring to Rule 1, the attribute condition "ANY" in the source machine attribute condition indicates that there is no restriction on source machine conditions. Module 256 does not have to resolve set operations. Module 258 generates a single firewall rule source condition portion that specifies "ANY."

Still referring to Rule 1, the attribute condition "(HTTP INTERSECTION Bldg1)" in the destination machine attribute condition portion requires that module 260 searches for an update attribute that matches the attribute "HTTP" and also searches for an update attribute that matches the attribute "Bldg1." Module 264 resolves the INTERSECTION (set-AND) operation to identify all machines that possess both the HTTP attribute (i.e., machines that run application HTTP) AND the Bldg1 attribute (i.e., machines physically located in building 1). Module 266 generates a firewall rule destination condition portion for each machine that possesses both the HTTP and Bldg1 attributes. Note that in this example, updated HTTP attribute information is obtained from software discovery tool 114 and that updated Bldg1 attribute information is obtained from infrastructure management tool 116.

Module 268 produces a separate firewall rule for each possible combination of the single firewall rule source machine portion generated by module 258 (containing "ANY") with a firewall rule destination portion generated by module 266. Module 268 also tacks on the other conditions, i.e., destination port=80; protocol=80 and result=Accept to each separate firewall rule. Thus, for example, if there are twenty machines with twenty different endpoint identifiers that satisfy the destination machine attribute condition portion of Rule 1, then the transformation of Rule 1 results in generation of twenty firewall rules.

Referring to Rule 2, the attribute condition "(VLAN20 UNION VLAN 30)" in the source machine attribute condition portion requires that module 252 search for an update attribute that matches the attribute "VLAN20" and also search for an update attribute that matches the attribute "VLAN30." Module 256 resolves the UNION (set-OR) operation to identify all machines that possesses either the VLAN20 attribute (i.e., machine is a member of VLAN20) OR possesses the VLAN30 attribute (i.e., machine is a member of VLAN30). Module 258 generates firewall rule source condition portions in which each portion contains the source endpoint of a machine that possess either the VLAN20 attribute or the VLAN30 attribute. In this example, updated VLAN20 and VLAN30 attribute information is obtained from the network management tool 118. Assuming only two machines satisfy the source machine attribute condition portion of Rule 2 and twenty machines satisfy the destination machine attribute condition portion of Rule 2, then module 268 results in the generation of one or more firewall rules that collectively encompass every combination of a source machine endpoint identifier from the two source machines and a destination machine endpoint identifier from the twenty destination machines. Note that firewall rules can be defined in terms of single source or destination machine endpoints and in terms of spans of source machine or destination machine endpoints or a combination of both.

FIG. 3 is an illustrative drawing showing a screen display produced based upon information gathered by a software discovery tool 114 showing first attribute information and corresponding endpoint identifiers for machines operative in the system of FIG. 1. It will be understood that the screen display is scrollable and not all of the information shown in FIG. 3 is visible on screen simultaneously. The column labeled "Hostname/IP" sets forth endpoint identifiers for machines. In this example, the endpoint identifies comprise IP addresses. The column labeled "Coverage" indicates the applications running on a given machine. The column labeled "Operating System" indicates the operating system running on the given machine. The "State" and "Network Activity" are not relevant to this disclosure.

Referring to FIG. 2A, modules 201-204 cause the firewall manager 108 to regularly obtain from the software discovery tool 114 the first attribute in formation and machine identifiers shown in FIG. 3. Modules 201-204 may operate to obtain first attribute information only for machines with first attribute information that has changed since the last running of the process 200. Alternatively, modules 201-204 may operate to obtain information for all machines whether or not the first attribute information has changed.

FIG. 4 shows an illustrative set of policy rules with attribute dependent conditions dependent upon application software running on source machines and operating system software running on destination machines. Each policy rule has the same format, which specifies two attribute-dependent conditions. One condition is dependent upon a set of specified attributes that include the application(s) running a source computer. The other condition is dependent upon a set of specified attributes that include specific operating system(s) running on the destination machine. Neither rule contains set operations.

FIG. 5 shows an illustrative set of firewall rules produced by the firewall manager 108 according to the processes of FIGS. 2A-2B based upon the policy rules of FIG. 4 and the first attribute information and corresponding endpoint identifiers of FIG. 3. Each firewall rule of FIG. 5 is derived from one of the policy rules of and follows the same format as its corresponding rule in FIG. 4 from which it is derived. The firewall rules are machine-dependent since an endpoint of a specific source machine is set forth for each source machine dependent condition, and an endpoint of a specific destination machine is set forth for each destination machine dependent condition. The firewall engine dynamically determines which is the source endpoint and which is the destination endpoint for a given message when it captures and inspects messages en route between networks. The firewall engine 102 applies the example rules of FIG. 5 to determine appropriate actions.

Therefore, the firewall manager 108 transforms the policy rules of FIG. 4 to the firewall rules of FIG. 5 based upon the first attributes (i.e. software running on the machines) shown in the screen display of FIG. 3. The firewall manager 108 sends the updated firewall rules to the firewall engine for storage in media 101. Referring to the firewall rules of FIG. 6, for example, the firewall engine 102 will block a packet having a source machine identifier 10.115.198.108, a destination machine identifier 10.17.6.237 and having ANY source port and having a destination port 80.

Figure 6B:
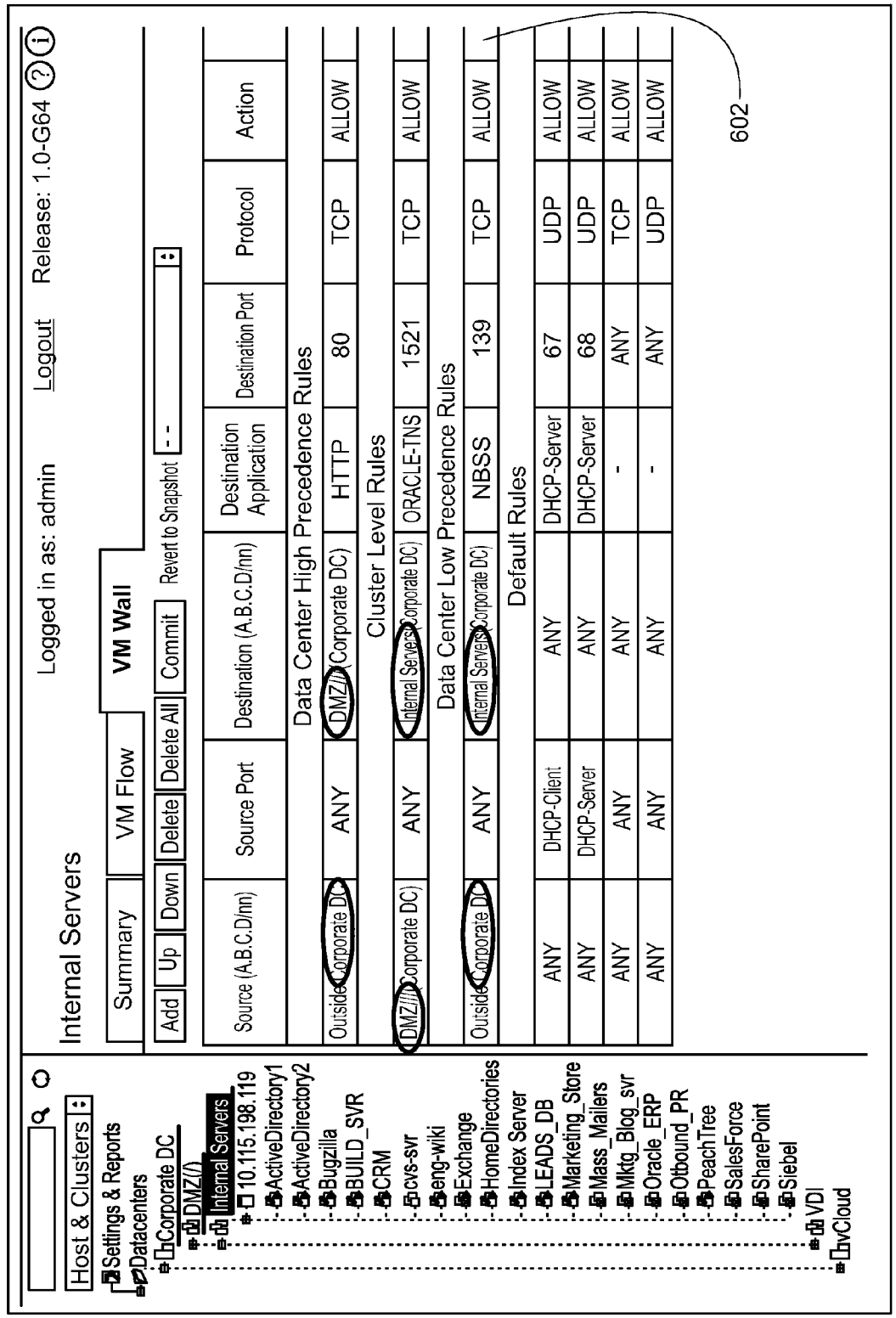

FIGS. 6A-6C are illustrative drawings showing screen displays produced based upon information gathered by a infrastructure management tool 116 showing a machine location hierarchy specifying second attribute information (i.e. physical location) and example policy rules (FIGS. 6A-6B) and mappings between machines and endpoint identifiers (FIG. 6C). The left sides of the screen displays of FIGS. 6A-6B show a location hierarchy in which the Corporate DC (Data Center) is at a level directly below the Datacenters location, which is the highest level in the location hierarchy. That is, all other locations are "within" the Datacenters location. The next level in the location hierarchy includes a DMZ server, Internal Servers and a VDI (video) server, which means that each of these is a separate location within the Datacenters location. The Internal Servers host a plurality of VMs: ActiveDirectory1, ActiveDirectory2, Bugzilla, . . . SharePoint, Siebel, all of which are at the same location hierarchy level within the Internal Server. Each VM in this example is identified by a VM name, which serves as its endpoint identifier. The IP address 10.115.198.119 is the IP address of the cluster where the aforementioned VMs reside.

The right sides of the screen displays of FIGS. 6A-6B show example policy rules each having the format shown in Table 2.

TABLE 2

| Source Machine Location | Source Port | Destination Machine Location | Destination Port | Protocol | Action |
|---|---|---|---|---|---|

Note that the "Destination Machine Application" shown in FIGS. 6A-6B is not included in the policy rule of Table 2 since it is implicit from the "Destination Port" and the "Protocol." Also, note that no set operations are specified.

A present embodiment uses a distributed implementation of the firewall engine 102, which comprises a plurality of firewall agents (not shown) that regulate information flows at different points in the system 100. One challenge in managing a distributed firewall engine is to manage the multiple agents and to send the right firewall rules to the right firewall agents. A centralized and hierarchical rule specification interface mitigates the problem. The location hierarchy of Datacenter and cluster serve as two natural points to specify which policy rules apply to which firewall agents.

The policy rules on the right side of FIG. 6A are created by network administrator personnel, for example, to be applicable to a firewall engine agent (not shown) at "Corporate DC" level; these rules are sent to all firewall agents on hosts under "Corporate DC." The policy rules on the right side of FIG. 6B are created by a network administrator, for example, to be applicable to firewall engine agents (not shown) at the "Internal Servers" cluster level. This group of rules inherit the rules specified at the parent datacenter.

The policy rules shown in FIGS. 6A-6B include attribute-dependent conditions that are dependent upon specified second attributes: "Source Machine Location" and "Destination Machine Location." The policy rules set forth conditions that are dependent upon the specified second attribute set forth in the rule. The rules of FIGS. 6A-6B are prioritized and are listed in priority order. The firewall engine 102 applies firewall rules in priority order based upon the prioritization of the corresponding policy rules from which they are derived. The policy rules under the heading "Data Center High Precedence Rules" in FIGS. 6A-6B have the highest priority level, and firewall rules derived from these highest priority rules are applied before the firewall rules derived from policy rules under the category "Cluster Level Rules," "Data Center Low Precedence Rules" or "Default Rules" in FIG. 6B. Similarly, for example, firewall rules derived from policy rules under the heading "Cluster Level Rules" are applied before the firewall rules derived from policy rules under the category "Data Center Low Precedence Rules" or "Default Rules" in FIG. 6B.

Modules 201-204 shown in FIG. 2A cause the firewall manager 108 to obtain the second attribute and machine identifiers shown in FIGS. 6A-6B. Moreover, policy rules under the heading "Rules below this level . . . " in FIG. 6A obtain from the infrastructure management tool 116. The entries in the Source and Destination fields of FIG. 6A-6B include "Corporate DC," "DMZ" and "Internal Servers."

FIG. 6C is an illustrative drawing showing a mapping between the machines within the "Internal Servers" shown in FIGS. 6A-6B and their endpoint identifiers. The infrastructure management tool provides the illustrated mapping. For example, the machine identified as "HomeDirectories" has an IP address IP108.

As explained with reference to the processes of FIGS. 2A-2B, the firewall manager 108 uses the attribute information provided on the left sides of FIGS. 6A-6B together with the endpoint mapping of FIG. 6C and the policy rules of the right sides of FIGS. 6A-6B to produce firewall rules. Thus, for example, the firewall manager will transform the policy rule labeled 602 in FIGS. 6A-6B to a set of firewall rules including the following firewall "rules" represented by Table 3.

TABLE 3

| Source Identifier | Source Port | Destination Identifier | Destination Port | Destination Protocol | Action |
|---|---|---|---|---|---|
| IP106 | ANY | (Any IP address | 139 | TCP | Allow |

TABLE 3-continued

| Source Identifier | Source Port | Destination Identifier | Destination Port | Destination Protocol | Action |
|---|---|---|---|---|---|
| | | NOT in Corporate DC) | | | |

For example, based on the firewall rules of Table 3, the firewall engine 102 will allow passage of a packet originating from a VM named "eng-wiki," which has IP address IP106 and that specifies a packet contents including a destination port 139 and a protocol TCP and a destination address anywhere outside of the Corporate DC. Note that the "NOT" operator in Table 3 indicates passage for a packet based upon the absence of the destination IP address in a comprehensive list of IP addresses within the Corporate DC. Thus, it will be appreciated that the firewall rules represented by Table 3 may be more completely represented by expanding the table to include a separate row for each IP address in the Corporate DC. The firewall engine 102 compares the destination address in the packet with each address in the Corporate DC and permits passage only if there is no match and the other conditions in the rules are met.

FIG. 7 is an illustrative drawing showing a screen display produced based upon information gathered by a network management tool 118 showing a machine network hierarchy specifying third attribute information (i.e. network connections) and corresponding policy rules. The policy rules shown in FIG. 7 may be created by network administrator personnel, for example. FIG. 7 shows a network hierarchy in which the Datacenters level is at the highest level. The Corporate DC and vCloud network are at the next level in the network hierarchy, which means that they are separate networks within the Datacenters network. The Corporate DC includes multiple VLANs: VLAN 2, VLAN 20, VLAN 30, VLAN 40, VLAN 50, VLAN 60 and VLAN 70, which means that each of these VLANs is a separae network within the Corporate DC network. The Corporate DC also includes "No VLAN (0)" at the same network hierarchy level as the other VLANs within the Corporate DC network. The vCloud network, which is at the same level in the network hierarchy as the Corporate DC network, includes No VLAN (0).

Port groups are defined at a next level below the VLAN level within the network hierarchy. VLAN 20 includes an Engineering port group. VLAN 30 includes a Sales port group. VLAN 40 includes a Human Resources port group. VLAN 50 includes a Finance port group. VLAN 60 includes a Corporate Servers port group. Moreover, within the vCloud network, within the NoVLAN(0), port groups named dvPortGrpoup and VM Networ are defined.

Virtual machines are defined at a next level below the port group level within the network hierarchy. For example, the Engineering port group includes VMs identified as BUILD_SVR, cvs-svr, Bugzilla and eng-wiki. The Finance port group includes VMs identified as PeachTree and Siebel.

The right side of the screen display of FIG. 7 shows example policy rules each having the format shown in Table 4.

TABLE 4

| Source Machine Network | Source Port | Destination Machine Network | Destination Port | Protocol | Action |
|---|---|---|---|---|---|

The policy rules specified in FIG. 7 include two attribute-dependent conditions that are dependent upon specified second attributes: "Source Machine Location" and Destination Machine Location." Similar to the policy rules of FIGS. 6A-6B, the policy rules of FIG. 7 are prioritized and are listed in priority order. The policy rule condition "Outside Corporate DC" signifies a "not in" set operation. Conversely, the policy rule condition "Inside Corporate DC" signifies an "in" set operation.

FIG. 8 is an illustrative drawing showing a mapping between the virtual machines within the "Engineering" and "Finance" shown in FIG. 7 and their endpoint identifiers. The network management tool provides the illustrated mapping. For example, the VM identified as "Bugzilla" has an IP address IP802.

FIG. 9 shows an illustrative set of firewall rules produced by the firewall manger 108 based upon the policy rule 702 of FIG. 7 and the mapping of FIG. 8. For example, based on the firewall rules of FIG. 8, the firewall engine 102 will deny passage of a packet originating from a source machine endpoint that has IP address IP801 and that specifies a destination port 1521 and a protocol TCP and that has a destination address IP804.

Figure 10:
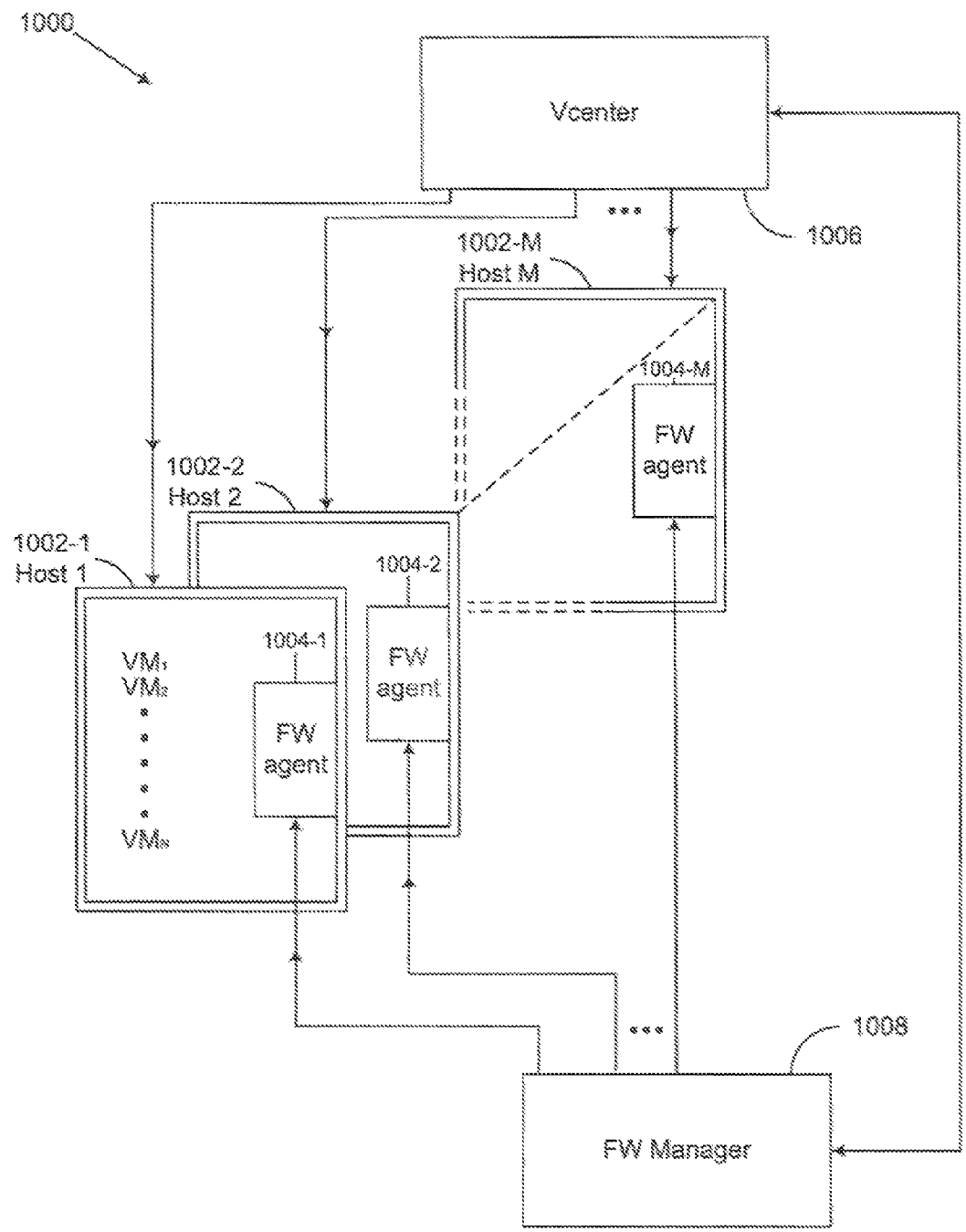
FIG. 10 is an illustrative block diagram of a system comprising a plurality of host systems each running a plurality of virtual machines running protected by a firewall that comprises a plurality of firewall agents.

FIG. 10 is an illustrative block diagram of a system 1000 comprising a plurality of host systems each running a plurality of virtual machines running protected by a distributed firewall engine that comprises a plurality of firewall agents. The system 1000 includes Hosts 1002-1 to 1002-M. Virtual machines VM1-1 to VM1-X run on host 1002-1. A plurality of virtual machines (not shown) also run on each of Hosts 1002-2 to 1002-M. Different VMs may run different applications and different operating systems. Different hosts may be at different locations such that VMs running on different hosts also may be at different locations. Furthermore, different VMs can be members of different networks, even if they run on the same host. Respective firewall engine agents 1004-1 to 1004-M run on respective Hosts 1002-1 to 1002-M. Each firewall agent applies the firewall rules to messages passed between virtual machines. A virtual infrastructure management tool 1006 performs the function of update gathering tools 114, 116 and 118 described above. In the manner described with reference to FIGS. 2A-2B, a firewall manager 608 obtains attribute information from the virtual infrastructure management tool 1006, and transforms policy level rules to firewall rules and distributes the updated firewall rules to the firewall agents 1004-1 to 1004-M.

The foregoing description and drawings of embodiments in accordance with the present invention are merely illustrative of the principles of the invention. For example, it will be understood that the principles described herein apply to more complex systems with numerous networks and sub-networks protected with firewalls and to systems involving one or more private networks, such as a private corporate network, and a public network such as the Internet, for example. Therefore, it will be understood that various modifications can be made to the embodiments by those skilled in the art without departing from the spirit and scope of the invention, which is defined in the appended claims.

What is claimed is:

1. A method to control the flow of packets through a firewall that is implemented in a system that includes one or more computer networks comprising:
   storing policy rules in machine readable storage media that set forth attribute dependent conditions for communications among machines on the one or more computer networks;
   obtaining respective machine attributes and corresponding machine identifiers for respective machines on the one or more computer networks;
   transforming the policy rules to firewall rules that include machine identifiers of machines having attributes from among the obtained machine attributes that satisfy the attribute dependent policy rules, wherein transforming the policy rules to firewall rules further includes:
      matching an attribute condition within a policy rule with one or more obtained machine attributes;
      generating at least one firewall rule for each machine identifier of a machine having all machine attributes required to satisfy the attribute condition within the policy rule;
      resolving at least one set operation within the attribute condition to produce a resolved attribute condition; and
      generating at least one firewall rule for each machine identifier of a machine having all attributes required to satisfy the resolved attribute condition within the policy rule;
   storing the firewall rules in machine readable storage media; and
   filtering communications from and to a first machine on the one or more computer networks and communications from and to a second machine on the one or more computer networks at the firewall according to the firewall rules.

2. The method of claim 1 further including:
   identifying an occurrence of one or more updates to at least one of the networks;
   wherein the act of obtaining machine attributes and corresponding machine identifiers is responsive to identification of an occurrence of one or more updates to the at least one of the networks.

3. The method of claim 2, wherein at least one identified update includes a change in an attribute of a machine of the at least one of the networks.

4. The method of claim 3, wherein the change in an attribute includes a change in an inventory of software running on a machine from the at least one of the networks.

5. The method of claim 3, wherein the change in an attribute includes a change in physical location of a machine from the at least one of the networks.

6. The method of claim 3, wherein the change in an attribute includes a change in a network property of a machine from the at least one of the networks.

7. The method of claim 2, wherein at least one identified update includes an addition of a machine to the at least one of the networks.

8. The method of claim 2, wherein at least one identified update includes a deletion of a machine from the at least one of the networks.

9. The method of claim 1, further including:
   receiving from a machine attribute update gathering tool an indication of an occurrence of one or more updates to at least one of the networks;
   wherein the act of obtaining machine attributes and corresponding machine identifiers is responsive to receiving such indication of an occurrence of one or more updates to the at least one of the networks.

10. The method of claim 9 further including:
periodically sending an update inquiry to the machine attribute update gathering tool.

11. The method of claim 1 further including:
identifying an occurrence of one or more manual updates to membership of a set of machines;
wherein the act of obtaining machine attributes and corresponding machine identifiers is responsive to identification of an occurrence of one or more updates to the set of machines.

12. The method of claim 1, wherein resolving the at least one set operation within the attribute condition to produce the resolved attribute condition further including:
resolving an intersection set operation within the attribute condition to a set of machines matching at least one attribute condition within the policy rule subject to the intersection set operation with one or more obtained machine attributes.

13. The method of claim 1 further including:
inspecting a packet en route within the system to identify a machine identifier associated with the packet;
searching for a match between the identified machine identifier and a machine identifier within a stored firewall rule; and
configuring a firewall engine to pass the packet or to deny passage of the packet based at least in part upon whether one or more stored firewall rules includes a machine identifier that matches the identified machine identifier within the packet.

14. The method of claim 1, wherein the firewall is a central firewall that filters communications from and to all machines in one of the computer networks including the first machine and the second machine.

15. The method of claim 1, wherein the first and second machines are virtual machines running in a host computer and the firewall is configured in the host computer to filter communications from and to virtual machines running in the host computer including the first machine and the second machine.

16. An article of manufacture including non-transitory computer readable storage media encoded with program code to cause a processor to execute a process to control the flow of packets through a firewall that is implemented in a system that includes one or more computer networks, said process comprising:
storing policy rules in machine readable storage media that set forth attribute dependent conditions for communications among machines on the one or more computer networks;
obtaining respective machine attributes and corresponding machine identifiers for respective machines on the one or more computer networks;
transforming the policy rules to firewall rules that include machine identifiers of machines having attributes from among the obtained machine attributes that satisfy the attribute dependent policy rules, wherein transforming the policy rules to firewall rules further includes:
matching an attribute condition within a policy rule with one or more obtained machine attributes;
generating at least one firewall rule for each machine identifier of a machine having all machine attributes required to satisfy the attribute condition within the policy rule;
resolving at least one set operation within the attribute condition to produce a resolved attribute condition; and
generating at least one firewall rule for each machine identifier of a machine having all attributes required to satisfy the resolved attribute condition within the policy rule;
storing the firewall rules in machine readable storage media; and
filtering communications from and to a first machine on the one or more computer networks and communications from and to a second machine on the one or more computer networks at the firewall according to the firewall rules.

17. The method of claim 16, wherein the first and second machines are virtual machines running in a host computer and the firewall is configured in the host computer to filter communications from and to virtual machines running in the host computer including the first machine and the second machine.

18. The article of manufacture of claim 16, wherein the first and second machines are virtual machines running in a host computer and the firewall is configured in the host computer to filter communications from and to virtual machines running in the host computer including the first machine and the second machine.

* * * * *